Oct. 17, 1961     Y. FOULON     3,004,388
MOUNTING AND ADJUSTING DEVICE FOR THE INNER RING
OF A COMBINED TURBO-JET-RAM-JET ENGINE
Filed July 14, 1959     4 Sheets-Sheet 1

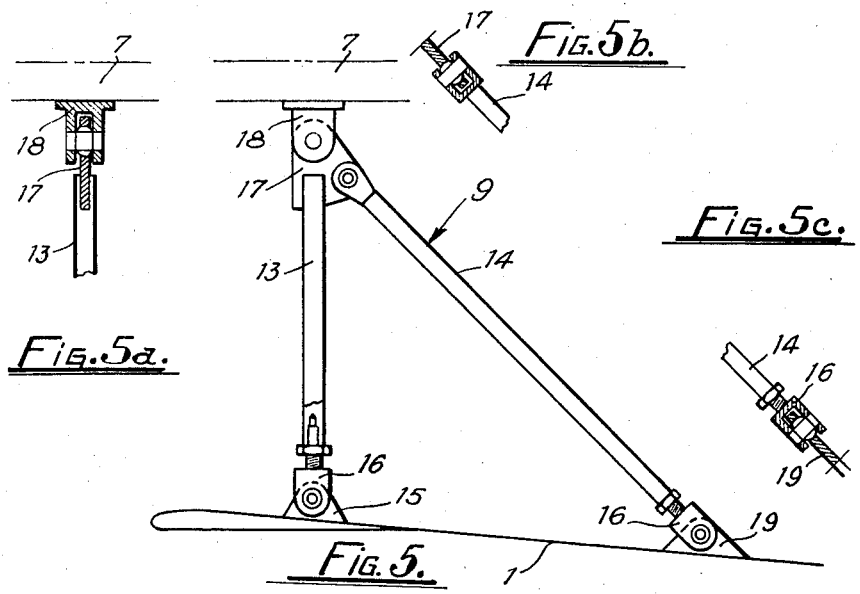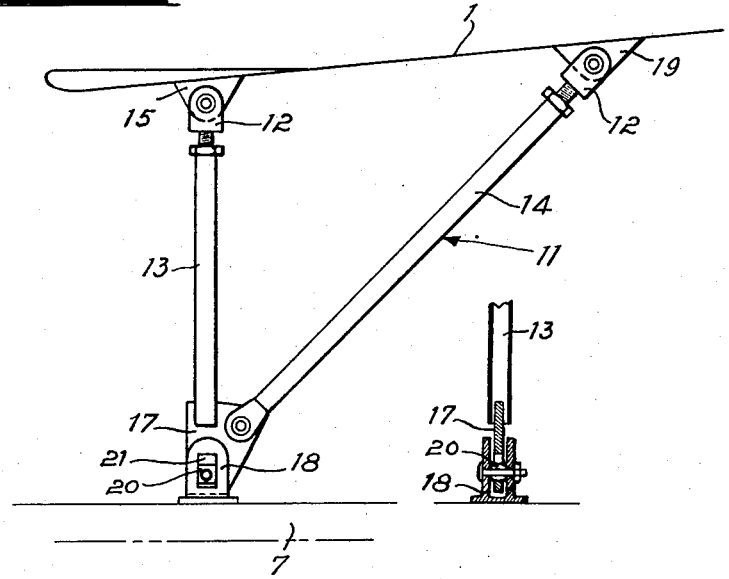

United States Patent Office 3,004,388
Patented Oct. 17, 1961

3,004,388
MOUNTING AND ADJUSTING DEVICE FOR THE INNER RING OF A COMBINED TURBO-JET-RAM-JET ENGINE
Yvon Foulon, Versailles, France, assignor to Nord-Aviation, Société Nationale de Constructions Aéronautiques, Paris, France, a joint-stock company of France
Filed July 14, 1959, Ser. No. 827,068
Claims priority, application France Mar. 28, 1959
5 Claims. (Cl. 60—39.32)

The present invention relates to a mounting and adjusting device for the protective inner ring of a combined turbo-jet-ram-jet engine.

The lengths of the nozzles of the turbo-jet and of the ram-jet in this type of engine are in a fixed ratio. This results in the turbo-jet nozzle being of a substantial length and being cantilevered out from the securing flange of the outlet nozzle.

In order to eliminate the drawbacks due to this overhang of the nozzle and to the high operational temperatures to which it is subjected, it is necessary to use the downstream end of the inner ring as a guide for the said nozzle, this guide being necessarily of a resilient type in order not to form a fourth suspension point for the turbo-jet thereby making the entire suspension device hyperstatic.

The mounting device for the inner ring on the nacelle surrounding the combined jet-engine must be so designed that, at high operating temperatures in the turbo-jet, irrespective of whether the ram-jet is lit or not, the said ring and the turbo-jet nozzle are exactly coaxial. Accordingly, the mounting device has to satisfy the following conditions:

To support ring in such a way as to avoid transmitting the distortions due to its expansion (or contraction) to the inner wall of the nacelle, and to avoid a rotation of the ring in the plane transverse to its securing elements resulting therefrom.

To adjust by means of the aforesaid guide-member the position of the said ring relative to the turbo-jet nozzle, for their axes to coincide at normal running temperatures.

The object of the present invention is to provide a mounting and adjusting means for the inner ring of a combined turbo-jet-ram-jet engine which satisfies the conditions defined above.

It comprises essentially a plurality of triangular assemblies connecting the nacelle of the combined jet-engine to the said inner protective ring, each of these assemblies including a pair of struts, an upstream strut and a downstream strut, articulated with respect to each other at one of their ends on a communal gusset-piece and the said gusset-piece being in turn articulated to the nacelle, the two other ends of the said struts being articulated to the ring at points which are in parallel alignment with the axis of the said inner ring, the struts including means for adjusting their lengths, and the articulation on the nacelle of the said gusset-piece of the triangular assemblies enabling, on the one hand, two such assemblies to be simply pivoted, hereinafter referred to as rigid body assemblies, which are symmetrical relative to the central longitudinal vertical plane of symmetry of the inner ring, and wherein the two corresponding struts are convergent towards each other in the peripheral zone of the inner ring and, on the other hand, a limited translating motion to be achieved, simultaneously with said pivoting, for the other assemblies, hereinafter referred to as "sliding head" assemblies, whereby, the lengths of the arms being adjusted in the cold state, the turbo-jet and the inner ring remain coaxial when the turbo-jet is in operation, irrespective of whether the ram-jet is lit or not.

Other characteristics and advantages will become clear on reading the following description of preferred embodiments of the device according to the invention. This description is given with reference to the appended diagrammatic drawings, wherein:

FIGURE 5 is a side elevational view of a rigid body triangular assembly, FIGURES 5a, 5b and 5c being details of specific components of the said assembly;

FIGURE 6 is a side elevational view of a "sliding head" triangular assembly, FIGURE 6a being a detail of another embodiment of the sliding head of the said assembly.

Figure 1:
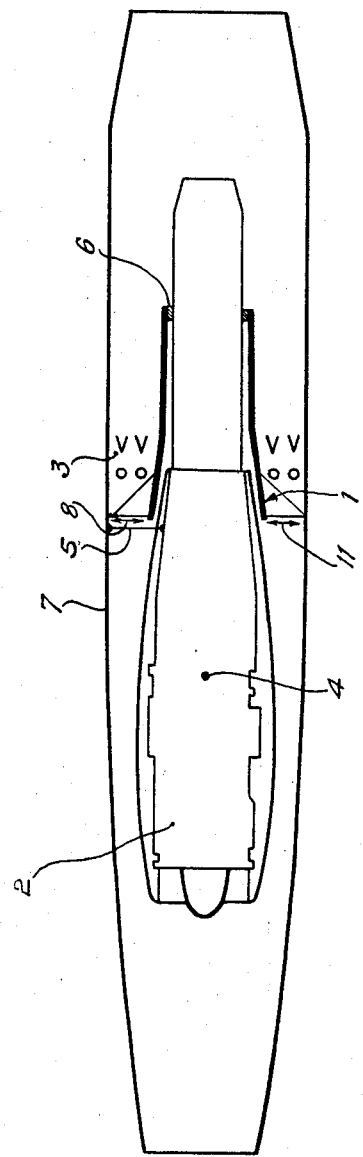
FIGURE 1 is a longitudinal section of a combined turbo-jet-ram-jet engine provided with an inner ring protecting a downstream portion of the turbo-jet.

In a combined turbo-jet-ram-jet engine (see FIGURE 1), the inner ring is a cylindrical member 1 surrounding the downstream portion of the turbo-jet 2 and isolating it from the combustion device 3 of the ram-jet. A cooling sheath of air is provided between the protective inner ring 1 and the corresponding portion of the turbo-jet.

The inner ring 1 is generally cone-shaped. Its upstream portion is doubled over to form a leading edge.

In the combined turbo-jet-ram-jet engine, the fixing of the turbo-jet 2 is effected by a three-point system which comprises:

(a) At the upstream portion: two side journals 4, the left-hand journal being fixed and the right hand journal being free in its housing to take up the radial expansions of the turbo-jet;

(b) At the downstream: a pendulum system consisting of a link 5 mounted on swivels and connected to the turbo-jet adjacent to the securing flange of the outlet nozzle.

Figure 2:
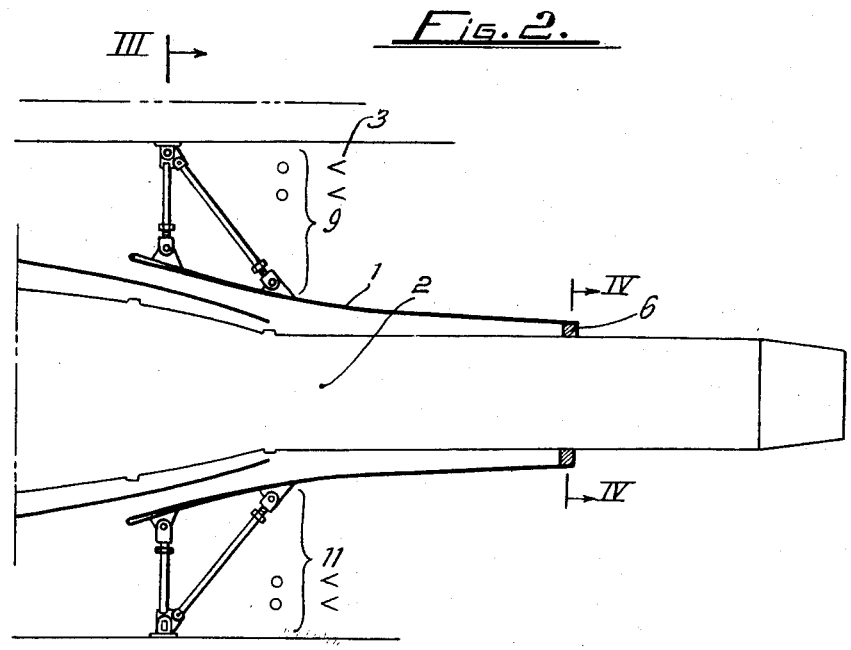
FIGURE 2 is a longitudinal section of the downstream portion of a combined turbo-jet-ram-jet engine, having its inner ring provided with the device in accordance with the invention.
Figure 3:
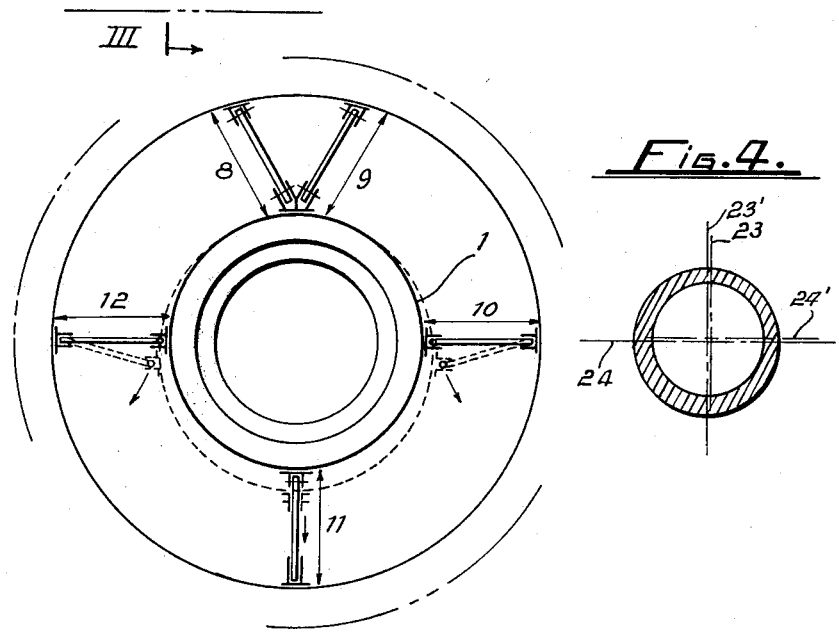
FIGURE 3 is a cross-section along line III—III of FIGURE 2.

In FIGURES 2 and 3, the device, in accordance with the invention, includes five triangular assemblies, two rigid body type assemblies 8 and 9 (see FIG. 5) and three sliding head type assemblies 10, 11, 12 (see FIG. 6). All these assemblies are symmetrical relative to the longitudinal vertical plane, the assemblies 8 and 9 converging on ring 1.

Each of the triangular structures 8 and 9 with a stationary head consists of an upstream strut 13 and a downstream strut 14 (see FIG. 5). The strut 13 is, at one end, articulated to swivel on a fixed mount 15 integral with ring 1 by means of an adjustable forked member 16 and, at the other end, rigidly secured on a gusset plate 17, which is itself articulated to swivel on a mount 18 on the nacelle 7 of the combined jet-engine (see FIG. 5a). The strut 14 is articulated to swivel, at one end on a mount 19 on ring 1 by means of an adjustable forked member 16 (see FIG. 5c) and at the other end, on the gusset plate 17 (see FIG. 5b).

It is to be noted that the upstream struts 13 of the rigid body assemblies 8 and 9 are secured to the same mount 15 of ring 1, whereas the downstream struts 14 are secured to the same mount 16 of ring 1 (see FIGURES 3, 5 and 6).

The triangular structures with a sliding head 10, 11, 12 are identical to the aforesaid triangular structures 8, 9, except in respect of the articulation of the gusset plate 17 on the mount 18 on the nacelle 7, the said articulation comprising a swivel mounted in a slide 20 (see FIG. 6) integral with the said mount 18 and movable in an aperture 21 formed in the said gusset plate 17. The dimensions of this aperture are calculated with respect to the maximum anticipated displacements (expansion and contraction).

The inverse arrangement of the slide 20 and the aperture 21, i.e. the slide integral with the triangular assembly and the aperture integral with the mount on the nacelle, is shown in FIGURE 6a.

The adjustment of the device according to the invention, the purpose of which, as has already been stated, is to make the ring 1 and the turbo-jet 2 coaxial when the said turbo-jet is operated under normal conditions, the ignition of the ram-jet having no influence whatever on their reciprocal positions.

This concentricity is attained by adjusting the support of ring 1 so as to locate, when the turbo-jet is cold, two fixed points of the axis of said ring in such positions that, when hot, the said two points are on the axis of the turbo-jet. These two points are the centre of the leading edge of ring 1 and the centre of its downstream section 6, FIG. 1, respectively. The position of the axis of the turbo-jet is itself determined by the three-point system.

Since the two upward rigid body assemblies 8 and 9 are so constituted that the axis of ring 1 can only move in the vertical plane containing the two mounts 15 and 19, the adjustment of the lengths of upstream struts 13 of said assemblies allows, when cold, of locating the centre of the leading edge of ring 1 (viz. the first of the above two points) in such a position that said centre be, when hot, on the turbo-jet axis. The adjustment of the lengths of upstream struts 13 of the sliding head assemblies 10, 11 and 12 is simply intended to allow the distribution of clearances corresponding to the displacements of their slides 20.

Figure 4:
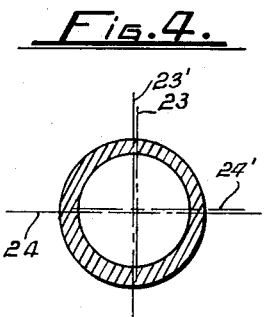
FIGURE 4 is a diagrammatic view showing the respective position of the axes of the turbo-jet and the ring when cold and when hot, under normal operating conditions.

The adjustment of the lengths of the downstream struts 14 of the above two kinds of assemblies allows, when cold, of locating the horizontal and vertical axes of the downstream section 6 of said ring in positions 23 and 24 (see FIG. 4) such that, when hot, they are in coincidence with the corresponding axes 23' and 24' of the same nozzle cross section. The centre of the downstream section 6 of ring 1 (second of the above mentioned points) is therefore; when hot, located on the turbo-jet axis. The axes of ring 1 and the turbo-jet 2, when hot, are thus coincident.

This adjustment having been carried out, if the ring 1 expands radially, the triangular assemblies with a rigid body 8 and 9, which are symmetrical with respect to the central longitudinal vertical plane of the nacelle 7 of the combined jet-engine, transfer the entire distortion of said ring 1 downwards. This distortion is absorbed by the displacement of slides 20 in the corresponding apertures 21.

At the same time, the turbo-jet 2 is displaced laterally due to its three-point suspension.

Figure 7:
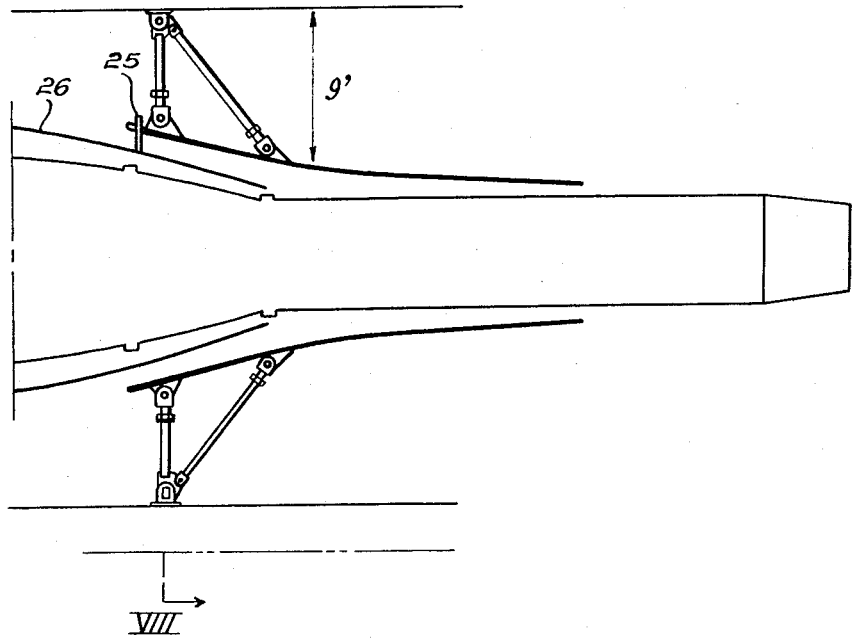
FIGURES 7 and 8 are respectively a side elevational view and a section along line VIII—VIII of FIGURE 7, of an alternative embodiment of the device according to the invention.
Figure 8:
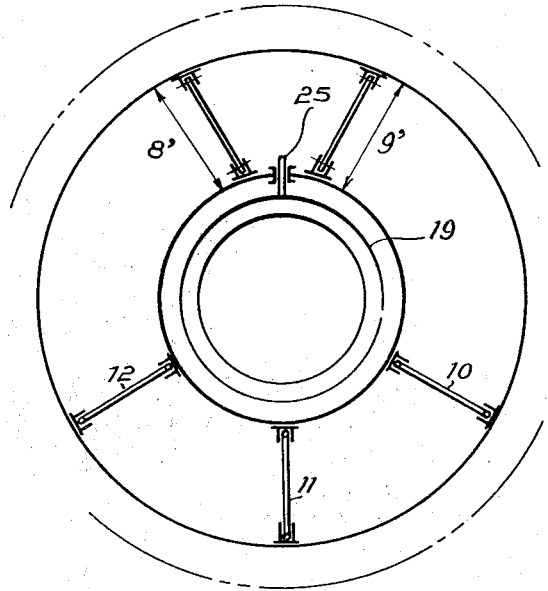

A second embodiment of the device according to the invention is shown in FIGURES 7 and 8. It corresponds to the case where, due to constructional problems, it is not possible for the rigid body triangular assemblies 8' and 9' to intersect on ring 1. The transversal spacing of their securing swivels connecting them with ring 1 is however reduced to a minimum value so as to limit the distortion of the ring portion therebetween. Given this spacing of the swivels, the assemblies 8' and 9' may no longer prevent the ring from rotating, and a stop member must be provided in the form of a vertical lug 25 mounted, for fitting purposes, on a fixed and rigid portion of the cowling 26 at the downstream portion of the turbo-jet, which part is never displaced. In order to enable the ring 1 to expand longitudinally, a slot is formed in the leading edge thereof in the path of lug 25.

It will be appreciated that the number of sliding head triangular assemblies need not be confined to that disclosed in the described embodiments. It can vary, but, although not a necessary condition, the said assemblies remain symmetrical with respect to the central longitudinal vertical plane of the combined jet-engine.

It is to be understood that the present invention has just been described and illustrated merely by way of explanation and without any intention of limitation, and that numerous changes in detail can be made therein without falling outside its scope.

What I claim is:

1. A mounting and adjusting device for the inner protective ring of a combined turbo-jet-ram-jet engine, each jet having a nozzle and a nacelle, said ring surrounding a downstream portion of the turbo-jet nozzle, the downstream end of said ring having a resilient guiding means for said nozzle, said device comprising a plurality of triangular assemblies uniting the nacelle of the combined jet-engine with said inner protective ring, each of said assemblies including an upstream strut and a downstream strut articulated to each other at one of their ends on a communal gusset-piece and said gusset-piece being itself articulated to the nacelle, the two other ends of said struts being articulated to the ring at points which are in parallel alignment with the axis of said inner ring, means on the struts for adjusting their lengths, and means for the articulation to the nacelle of said communal gusset-piece, said articulation means for the two struts in the triangular assemblies comprising merely a fixing means for two of said assemblies, two assemblies forming rigid body assemblies which are symmetrical in relation to the central vertical longitudinal plane of the ring and wherein the two corresponding struts converge towards each other in the peripheral zone of the inner ring and, for the other assemblies, said articulation means comprising both a fixing means and a limited sliding means, said other assemblies forming sliding head assemblies, the lengths of the struts being adjust when cold, whereby the turbo-jet and the inner ring are coaxial in normal operation of the turbo-jet.

2. A mounting and adjusting device for the inner ring as defined in claim 1, wherein the means for adjusting the length of each strut in the various triangular assemblies consists of an adjustable forked member interposed between one of the ends of the strut and a corresponding mount integral with said inner ring, said adjustable forked member containing a rod insertable up to any length into a corresponding housing in the strut.

3. A mounting and adjusting device for the inner ring as defined in claim 1, wherein the communal gusset-piece of the struts in a triangular assembly consists of a plate, the upstream strut being rigidly secured to said plate, while the downstream strut is articulated to swivel thereon.

4. A mounting and adjusting device for the inner ring as defined in claim 1, wherein said fixing and limited sliding means for said sliding head assemblies is embodied by said communal gusset-piece and a mount corresponding to said gusset-piece and attached to said nacelle comprising, for the one, a slide carrying a swivel, and, for the other, an aperture in which the said slide can operate.

5. A mounting and adjusting device for the inner ring as defined in claim 1, wherein the corresponding struts of two triangular rigid body assemblies are convergent towards each other at points located near to the periphery of and within the ring, in the central vertical longitudinal plane of symmetry thereof, a vertical lug secured on a fixed and rigid portion of the rear cowling at the back of the turbo-jet being engaged into a slot formed in the leading edge of the inner ring, parallel to the longitudinal axis of the latter.

References Cited in the file of this patent
UNITED STATES PATENTS

| | | |
|---|---|---|
| 2,529,955 | Morley | Nov. 14, 1950 |
| 2,596,435 | Robert | May 13, 1952 |
| 2,763,462 | McDowall | Sept. 18, 1956 |